Figure 1:
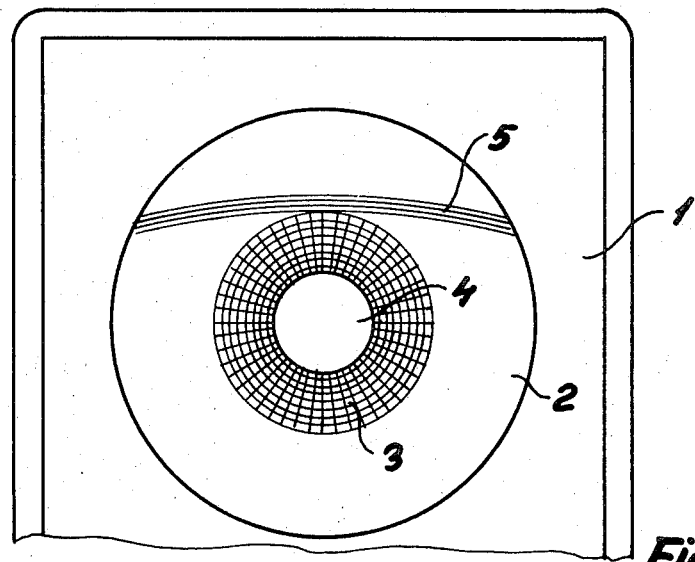

United States Patent [19]
Brondberg

[11] 3,802,436
[45] Apr. 9, 1974

[54] COLOSTOMY, ILEOSTOMY OR URETERSTOMY BAG

[76] Inventor: Arne Brondberg, Sovej 4, DK-3490 Kvistgaard, Denmark

[22] Filed: June 20, 1972

[21] Appl. No.: 264,654

[30] Foreign Application Priority Data
June 30, 1971 Denmark .......................... 3221/71

[52] U.S. Cl. ............................................. 128/283
[51] Int. Cl. .............................................. A61f 5/44
[58] Field of Search .................... 128/283, 294, 295

[56] References Cited
UNITED STATES PATENTS
3,292,626  12/1966  Schneider .......................... 128/295
3,522,807  8/1970  Millenbach ......................... 128/283
3,618,606  11/1971  Brown et al. ....................... 128/283

Primary Examiner—Charles F. Rosenbaum
Attorney, Agent, or Firm—Ladas, Parry, Von Gehr, Goldsmith & Deschamps

[57] ABSTRACT

A colostomy, ileostomy or ureterstomy bage of the type comprising an adhesive disc provided with a central opening and secured to the bag by a peripheral welding so that the entrance opening of the bag is concentric with the opening in the disc, characterized in that besides the peripheral welding there are one or more transverse welding seams extending substantially across the adhesive disc and provided in the part of the disc located above the entrance opening.

3 Claims, 2 Drawing Figures

COLOSTOMY, ILEOSTOMY OR URETERSTOMY BAG

This invention relates to a colostomy, ileostomy or ureterstomy bag of the type that comprises an adhesive disc provided with a central opening and secured to the bag by a peripheral welding so that the entrance opening of the bag is concentric with the opening in the disc. It has been found that such bags are attended with the risk that the adhesion to the wearer's skin may loosen in the upper portion of the adhesive region under the weight of the contents of the bag, and it is the aim of the present invention to suggest special measures to ensure improved retention of the bag. This aim has been accomplished by providing, besides the peripheral welding, one or more transverse welding seams extending substantially across the adhesive disc in the section of the disc disposed above the entrance opening of the bag. By means of such transverse welding seams the pull caused by the weight of the bag has been distributed over a relatively wide area, and it has been found that in this manner the adhesion to the wearer's skin will be very effective, so that this bag will be particularly useful where it is not supported by a belt but is to be retained in position by adhesion alone.

The desired relief of the pull has been found to be particularly effective where a welding has been provided on either side of the peripheral welding and level with the upper edge of the entrance opening of the bag, extending from the peripheral welding and substantially to the outer edge of the disc, and in another, very efficient embodiment the welding seam is arcuate and extends across the disc with its ends at the outer edge of the disc located approximately opposite the upper edge of the opening, while its central, upwardly curved section touches the upper section of the peripheral welding or is disposed thereabove. Obviously, these two specific embodiments may be combined so as to achieve the greatest possible efficiency.

Figure 2:
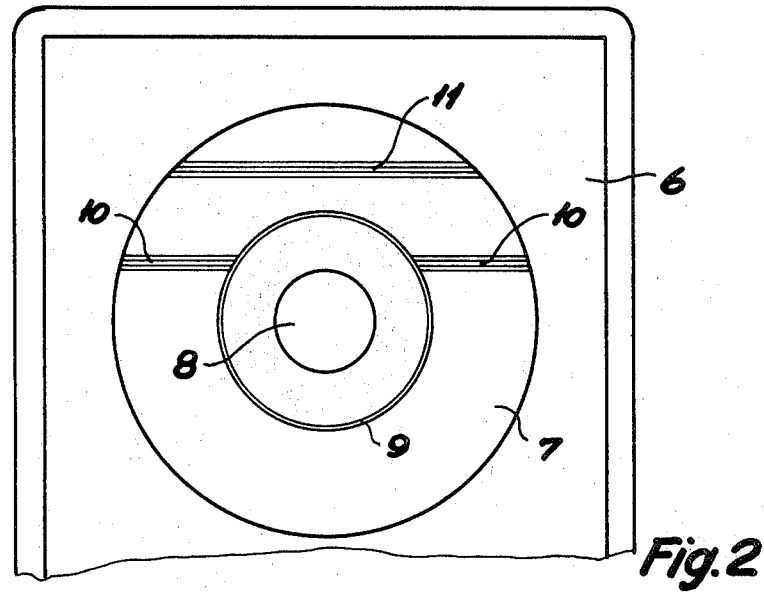

The invention will be described here in greater detail and with reference to the drawing, in which FIGS. 1 and 2 show two different embodiments of such bags viewed in side elevation.

FIG. 1 shows the upper portion of an embodiment of a colostomy, ileostomy or ureterstomy bag 1 according to the invention and to which is secured an adhesive disc 2 by means of a wide peripheral welding zone 3 surrounding an entrance opening 4 to the interior of the bag.

The adhesive disc 2 is further secured to the wall of the bag by means of a welding seam 5 extending approximately from the edge of the disc opposite the upper section of the opening 4 and in a curve above the annular welding zone 3.

FIG. 2 shows a modified embodiment of a bag 6 with an adhesive disc 7 which is welded around an entrance opening 8 to the wall of the bag by a peripheral welding seam 9 and further secured to the bag by two horizontal welding seams 10 opposite the upper section of the opening 8 and a horizontal welding seam 11 above the welding seam 9.

What I claim is

1. A colostomy, ileostomy or ureterstomy bag having an extrance opening in a wall thereof and an adhesive disc with a corresponding central opening, said disc being secured to the wall of the bag with the openings in alignment by peripheral welding surrounding and adjacent the opening but not extending to the edges of the disc, and also being secured to the wall of the bag by one or more welding seams extending substantially from one side edge to the other side edge of the disc and located in the portion of the disc above the opening.

2. A bag according to claim 1 in which a welding seam is provided having arcuate form with its central upwardly curved section adjacent or above the peripheral welding.

3. A bag according to claim 1 in which a welding seam is provided having two portions each extending from a respective side edge of the disc and meeting the peripheral welding above the opening.

* * * * *